United States Patent [19]

Marino et al.

[11] Patent Number: 4,476,531

[45] Date of Patent: Oct. 9, 1984

[54] ENGINE ANALYZER WITH DIGITAL WAVEFORM DISPLAY

[75] Inventors: Joseph A. Marino, Waukesha; Michael J. Kling, Mequon, both of Wis.; Sydney J. Roth, Largo, Fla.

[73] Assignee: Bear Automotive Service Equipment Company, Milwaukee, Wis.

[21] Appl. No.: 327,734

[22] Filed: Dec. 4, 1981

[51] Int. Cl.$^3$ ........................ G01M 15/00; G06F 15/20

[52] U.S. Cl. ................................ 364/431.01; 73/117.3; 324/379; 364/487

[58] Field of Search .................... 364/431.01, 442, 550, 364/551, 487; 73/116, 117.2, 117.3; 324/379

[56] References Cited

U.S. PATENT DOCUMENTS

| | | | |
|---|---|---|---|
| 4,006,403 | 2/1977 | Olsen et al. | 73/116 |
| 4,125,894 | 11/1978 | Cashel et al. | 364/442 |
| 4,128,005 | 12/1978 | Arnston et al. | 73/117.3 |
| 4,145,746 | 3/1979 | Trussel et al. | 364/551 |
| 4,184,205 | 1/1980 | Morrow | 364/550 |
| 4,267,569 | 5/1981 | Baumann et al. | 73/116 |
| 4,291,383 | 9/1981 | Tedeschi et al. | 364/551 |
| 4,295,363 | 10/1981 | Buck et al. | 73/117.3 |
| 4,373,186 | 2/1983 | Marshall et al. | 364/551 |
| 4,377,785 | 3/1983 | Ueno et al. | 324/388 X |
| 4,394,742 | 7/1983 | Crummer et al. | 364/487 |
| 4,401,948 | 8/1983 | Miura et al. | 324/388 X |

*Primary Examiner*—Felix D. Gruber

*Attorney, Agent, or Firm*—Kinney & Lange

[57] ABSTRACT

An engine analyzer for an internal combustion engine includes an analog-to-digital (A/D) converter which digitizes an analog electrical input waveform representing, for example, a secondary or primary voltage waveform of the ignition coil of the internal combustion engine. The digitized input waveform is stored in the form of digital data in a data memory. Upon request by the operator of the apparatus, a microprocessor selects digital data stored, and supplies that digital data to a display, which displays a visual representation of the waveform based upon the selected digital data.

22 Claims, 10 Drawing Figures

ENGINE ANALYZER WITH DIGITAL WAVEFORM DISPLAY

CROSS-REFERENCE TO RELATED APPLICATIONS

Reference is hereby made to the following copending applications, which were filed on even date with the present application and are assigned to the same assignee as the present application: ENGINE ANALYZER WITH CONSTANT WIDTH DIGITAL WAVEFORM DISPLAY, J. Marino and M. Kling, U.S. Pat. No. 4,399,407 ENGINE ANALYZER WITH SIMULATED ANALOG METER DISPLAY, J. Marino and M. Kling, Ser. No. 321,732 and IGNITION COIL TEST APPARATUS, J. Marino, M. Kling, S. Roth and S. Makhija Ser. No. 327,733.

BACKGROUND OF THE INVENTION

1. Field of the Invention

The present invention relates to engine analyzer apparatus used for testing internal combustion engines.

2. Description of the Prior Art

One common type of engine analyzer apparatus used for testing an internal combustion engine employs a cathode ray tube having a display screen on which analog waveforms are displayed which are associated with operation of the engine. In a typical apparatus of this type, a substantially horizontal trace is produced on the screen of the cathode ray tube by applying a sawtooth ramp voltage between the horizontal deflection plates of the tube while the analog signal being measured is applied to the vertical deflection plates of the tube. The typical analog signals which are applied to the vertical plates of the cathode ray tube are the primary voltage which exists across the primary winding of the ignition coil, and a signal representative of the secondary voltage of the ignition coil. These voltages are affected by the condition of various elements of the ignition system of the engine, such as the spark plugs.

In the case of a multicylinder internal combustion engine, the primary and secondary voltage waveforms have typically been displayed on the cathode ray tube in one of two ways. In one case, the waveform being displayed represents a complete cycle of the engine, in which the conditions associated with the various cylinders are displayed sequentially in a predetermined pattern. This type of display has commonly been referred to as a "parade" pattern or display.

In the other common method of displaying waveforms, there are a plurality of horizontal traces, one above the other, with each trace being associated with the operation of one of the cylinders of the engine. The number of horizontal traces usually corresponds to the number of cylinders on the engine. This method of displaying waveforms has been referred to in the industry as a "raster" display.

With the advent of low cost microelectronic devices, and in particular microprocessors, digital electronic systems have found increasing use in a wide variety of applications. Digital electronic systems have many significant advantages over analog systems, including increased ability to analyze and store data, higher accuracy, greater flexibility in design and application, and the ability to interface with computers having larger and more sophisticated data processing and storage capabilities. In the past, some engine analyzer systems have been proposed which utilize microprocessors and digital circuitry to control some of the functions of the engine analyzer apparatus. In these prior art systems, however, the waveform display function of the engine analyzer apparatus has remained essentially an analog electrical function, even when the systems utilize microprocessors and digital electronics for other functions.

SUMMARY OF THE INVENTION

The present invention is an engine analyzer apparatus for an internal combustion engine in which waveforms representing operation of a system or component of an internal combustion engine are displayed. Analog electrical input waveforms are digitized by the system of the present invention, and the digitized input waveform is stored in the form of digital data. Control means, which preferably includes a programmed digital computer such as a microprocessor, selects digital data which has been stored and provides display control signals based upon the selected stored digital data. Display means displays a simulated visual representation of an analog waveform based upon the display control signals.

The present invention, having stored digital data which forms the basis for displaying simulated waveforms, permits a wide variety of display modes including modes not possible in prior art real time analog displays. For example, the control means in one mode causes both a primary and a secondary waveform for the same selected cylinder to be displayed simultaneously. In another mode, only portions of the waveform corresponding to "points open" and "points close" transitions are displayed in expanded form, and those portions of the waveform which contain no useful information are not shown.

DETAILED DESCRIPTION OF THE PREFERRED EMBODIMENTS

Figure 1:
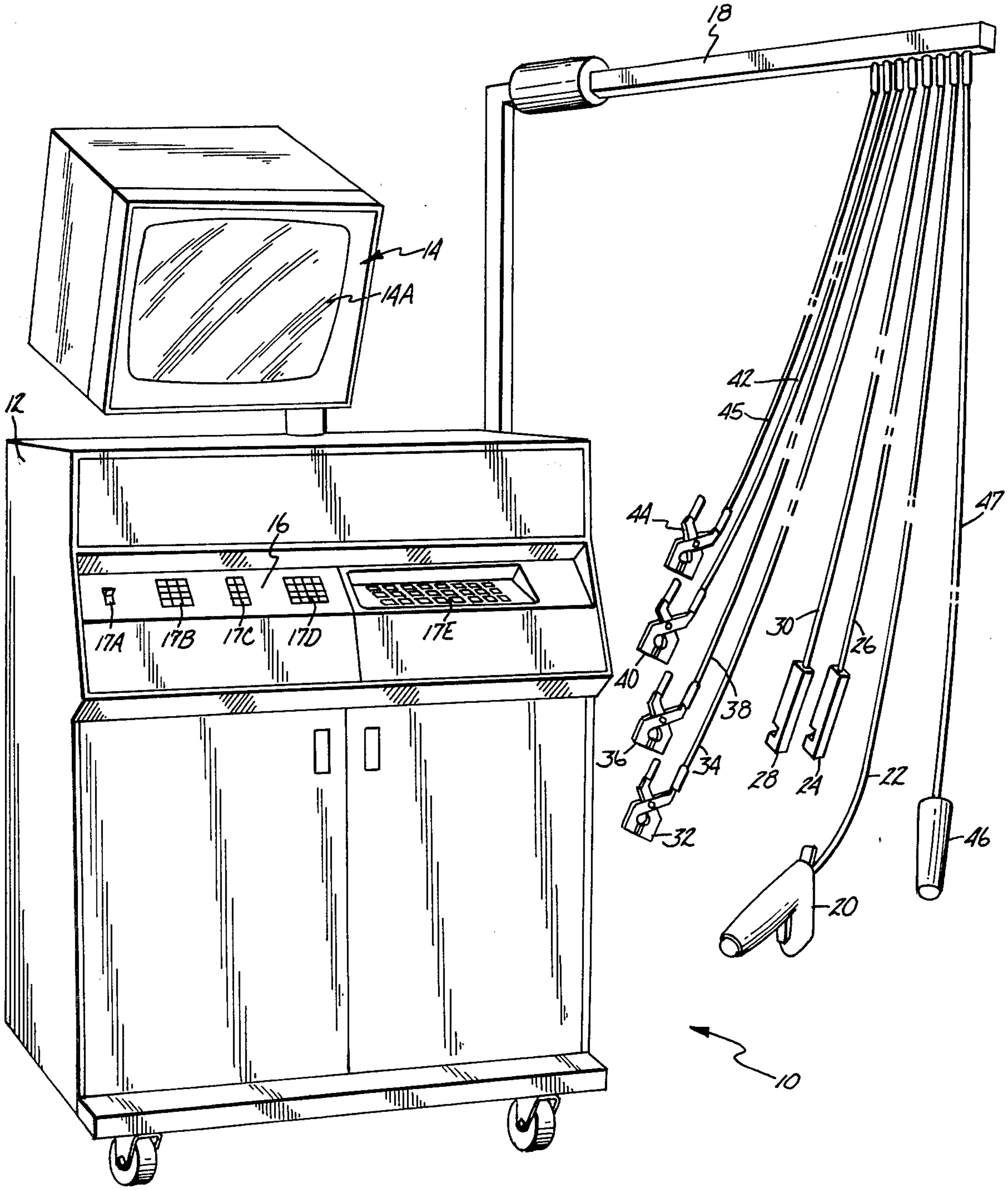
FIG. 1 is a perspective view showing an engine analyzer apparatus which utilizes the present invention.

In FIG. 1, engine analyzer 10 is shown. Mounted at the front of housing 12 of analyzer 10 are cathode ray tube (CRT) raster scan display 14 and user interface 16, which is preferably a control panel having a power switch 17A, three groups of control switches or keys 17B–17D, as well as a keyboard 17E for entering numerical information. Extending from boom 18 are a plurality of cables which are electrically connected to the circuitry within housing 12, and which are intended for use during operation of the analyzer 10. Timing light 20 is connected at the end of multiconductor cable 22. "High tension" (HT) probe 24 is connected at the end of multiconductor cable 26, and is used for sensing secondary voltage of the ignition system of an internal combustion engine of a vehicle (not shown). "No. 1" probe 28 is connected to the end of multiconductor cable 30, and is used to sense the electrical signal being supplied to the No. 1 sparkplug of the ignition system. "Engine Ground" connector 32, which is preferably an alligator-type clamp, is connected at the end of cable 34, and is typically connected to the ground terminal of the battery of the ignition system. "Points" connector 36, which is preferably an alligator-type clamp, is attached to the end of cable 38 and is intended to be connected to one of the primary winding terminals of an ignition coil of the ignition system. "Coil" connector 40, which is preferably an alligator-type clamp attached to the end of cable 42, is intended to be connected to the other primary winding terminal of the ignition coil. "Battery" connector 44, which is preferably an alligator-type clamp, is attached to the end of cable 45. Battery connector 44 is connected to the "hot" or "non-ground" terminal of the battery of the ignition system. Vacuum transducer 46 at the end of multiconductor cable 47 produces an electrical signal which is a linear function of vacuum or pressure, such as intake manifold vacuum or pressure.

In the present invention, electrical signals derived from probes 24 and 28 from connectors 32, 36, 40 and 44 and from vacuum transducer 46 are used to produce digitized waveforms which are stored as digital data in digital memory. Upon request by the user through user interface 16, analyzer 10 of the present invention displays on display 14 waveforms derived from selected stored digital data. In the present invention, therefore, the waveforms displayed by raster scan display 14 are not real time analog waveforms, as in the prior art engine analyzers, but rather are simulated representations of individual digitized waveforms which have previously been stored.

Figure 2:
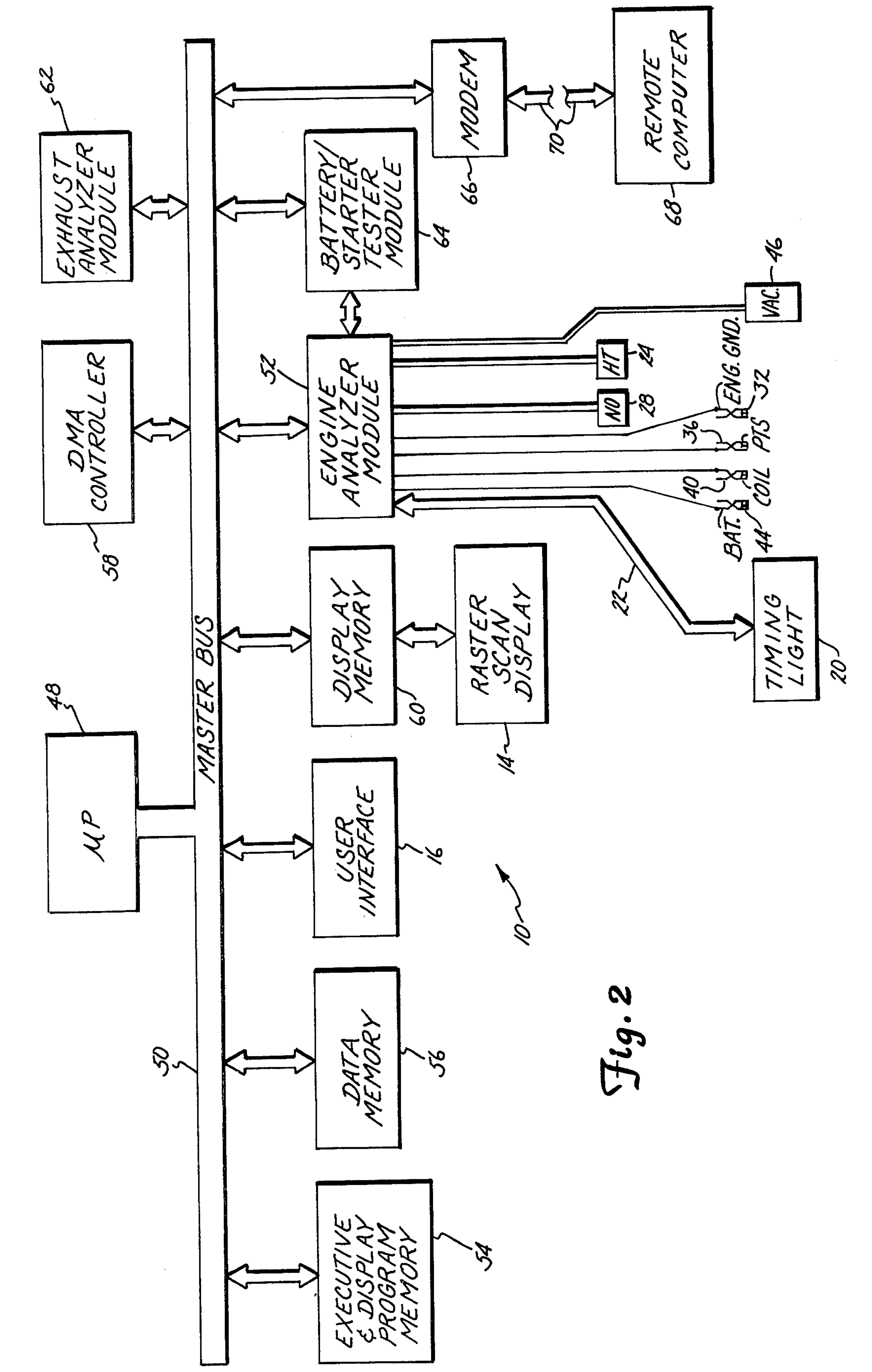
FIG. 2 is an electrical block diagram of the engine analyzer apparatus of FIG. 1.

FIG. 2 is an electrical block diagram showing engine analyzer 10 of the present invention. Operation of engine analyzer 10 is controlled by microprocessor 48, which communicates with the various subsystems of engine analyzer 10 by means of master bus 50. In the preferred embodiments of the present invention, master bus 50 is made up of fifty-six lines, which form a data bus, an address bus, a control bus, and a power bus.

Timing light 20, HT probe 24, No. 1 probe 28, Engine Ground connector 32, Points connector 36, Coil connector 40, Battery connector 44, and vacuum transducer 46 interface with the electrical system of engine analyzer 10 through engine analyzer module 52. As described in further detail later, engine analyzer module 52 includes a digital section and an analog section. Input signal processing is performed in the analog section, and the input analog waveforms received are converted to digitized waveforms in the form of digital data. The digital section of engine analyzer module 52 interfaces with master bus 50.

Control of the engine analyzer system 10 by microprocessor 48 is based upon a stored program in engine analyzer module 52 and a stored program in executive and display program memory 54 (which interfaces with master bus 50). Digitized waveforms produced, for example, by engine analyzer module 52 are stored in data memory 56. The transfer of digitized waveforms from engine analyzer module 52 to data memory 56 is provided by direct memory access (DMA) controller 58. When engine analyzer module 52 provides a DMA Request signal on master bus 50, DMA controller 58 takes control of master bus 50 and transfers the digitized waveform data from engine analyzer module 52 directly to data memory 56. As soon as the data has been transferred, DMA controller 58 permits microprocessor 48 to again take control of master bus 50. As a result, the system of the present invention, as shown in FIG. 2, achieves storage of digitized waveforms in data memory 56 without requiring an inordinate amount of time of microprocessor 48 to accomplish the data transfer.

User interface 16 interfaces with master bus 50 and preferably includes a keyboard 17E through which the operator can enter data and control keys 17B–17D through which he can select particular tests or particular waveforms to be displayed. When the operator selects a particular waveform by means of user interface 16, microprocessor 48 retrieves the stored digitized waveform from data memory 56, converts the digitized waveform into the necessary digital display data to reproduce the waveform on raster scan display 14, and transfers that digital display data to display memory 60. As long as the digital display data is retained by display memory 60, raster scan display 14 continues to display the same waveform.

Display memory 60 contains one bit for each picture element (pixel) that can be displayed on raster scan display 14. Each bit corresponds to a dot on screen 14A of raster scan display 14. In preferred embodiments of the present invention, the digitized waveform stored in data memory 56 represents individual sampled points on the waveform. Executive and display program memory 54 includes a stored display program which permits microprocessor 48 to "connect the dots" represented by the individual sampled points of the digitized waveform, so that the waveform displayed by raster scan display 14 is a reconstructed simulated waveform which has the appearance of a continuous analog waveform, rather than simply a series of individual dots. Microprocessor 48 determines the coordinates of the dot representing one digitized sampled point on the digitized waveform, determines the coordinates of the next dot, and then fills in the space between the two dots with additional intermediate dots to give the appearance of a continuous waveform. The digital display data stored in display memory 60, therefore, includes bits corresponding to the individual sampled points on the waveform which had been stored by data memory 56, plus bits corresponding to the intermediate dots between these individual sampled points.

As further illustrated in FIG. 2, engine analyzer 10 has the capability of expansion to perform other engine test functions by adding other test modules. These modules can include, for example, exhaust analyzer module 62 and battery/starter tester module 64. Both modules 62 and 64 interface with the remaining system of analyzer 10 through master bus 50 and provide digital data or digitized waveforms based upon the particular tests performed by those modules. In the preferred embodiments shown in FIG. 2, modulator/demodulator (MODEM) 66 also interfaces with master bus 50, to permit analyzer 10 to interface with remote computer 68 through communication link 70. This is a particularly advantageous feature, since remote computer 68 typically has greater data storage and computational capabilities that are present within analyzer 10. Modem 66 permits digitized waveforms stored in data memory 56 to be transferred to remote computer 68 for further analysis, and also provides remote computer 68 to provide test parameters and other control information to microprocessor 48 for use in testing.

Figure 3:
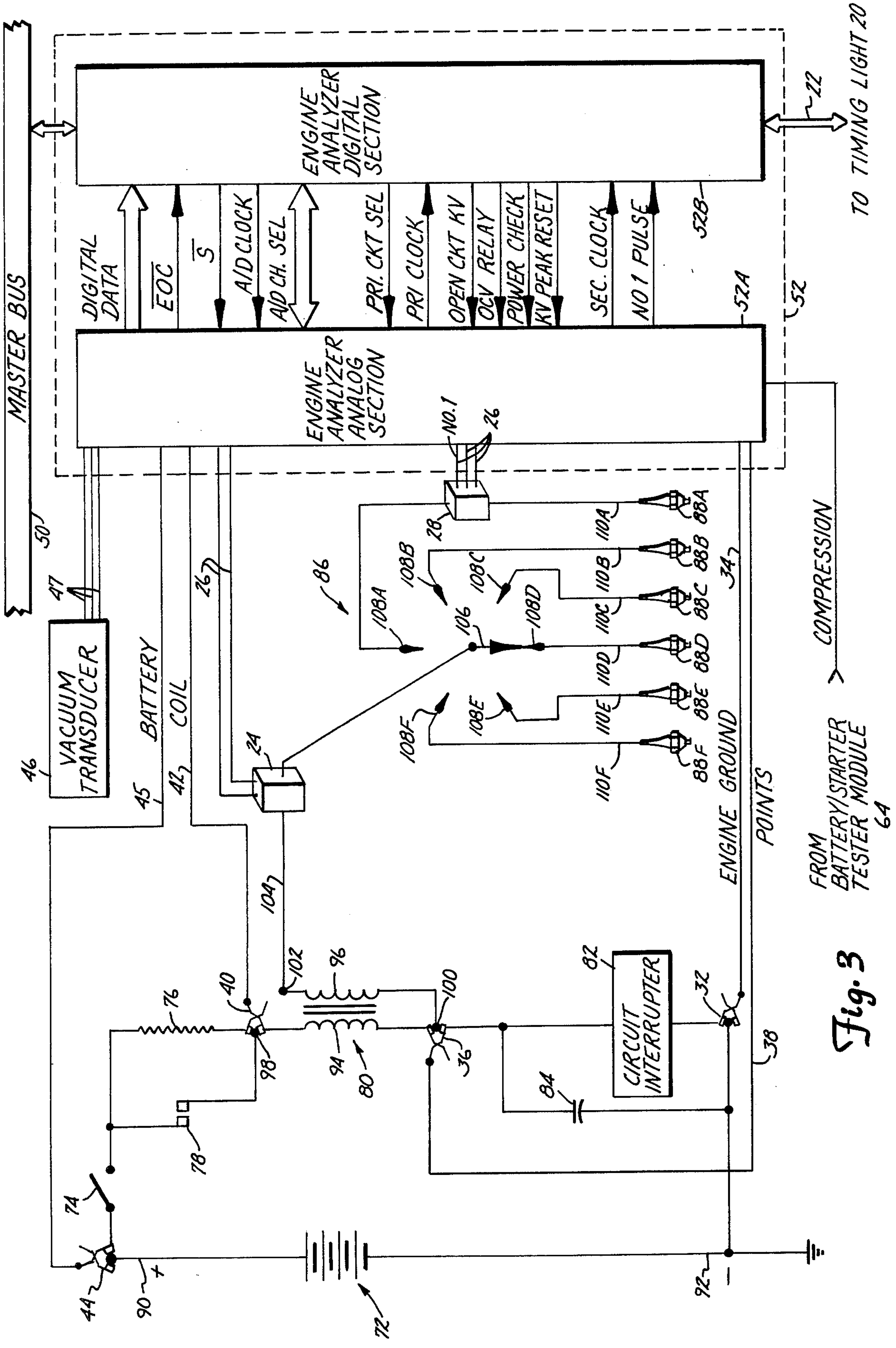
FIG. 3 shows the engine analyzer module of the apparatus of FIG. 2 in electrical schematic form in connection with a conventional ignition system of an internal combustion engine.

FIG. 3 shows engine analyzer 52 connected to a vehicle ignition system, which is schematically illustrated. The ignition system includes battery 72, ignition switch 74, ballast resistor 76, relay contacts 78, ignition coil 80, circuit interrupter 82, condensor 84, distributor 86, and igniters 88A–88F. The particular ignition system shown in FIG. 3 is for a six-cylinder internal combustion engine. Engine analyzer 10 of the present invention may be used with a wide variety of different engines having different numbers of cylinders. The six-cylinder ignition system shown in FIG. 3 is strictly for the purpose of example.

In FIG. 3, battery 72 has its positive (+) terminal 90 connected to one terminal of ignition switch 74, and its negative (−) terminal 92 connected to engine ground. Ignition switch 74 is connected in a series current path with ballast resistor 76, primary winding 94 of ignition coil 80, and circuit interrupter 82 between positive terminal 90 and engine ground (i.e. negative terminal 92). Relay contacts 78 are connected in parallel with ballast resistor 76, and are normally open during operation of the engine. Relay contacts 78 are closed during starting of the engine by a relay coil associated with the starter/cranking system (not shown) so as to short out ballast resistor 76 and thus reduce resistance in the series current path during starting of the engine.

Condensor 84 is connected in parallel with circuit interrupter 82, and is the conventional capacitor used in ignition systems. Circuit interrupter 82 is, for example, conventional breaker points operated by a cam associated with distributor 86, or is a solid state switching element in the case of solid state ignition systems now available in various automobiles.

As shown in FIG. 3, ignition coil 80 has three terminals 98, 100, and 102. Low voltage primary winding 94 is connected between terminals 98 and 100. Terminal 98 is connected to ballast resistor 76, while terminal 100 is connected to circuit interrupter 82. High voltage secondary winding 96 of ignition coil 80 is connected between terminal 100 and terminal 102. High tension wire 104 connects terminal 102 of coil 80 to distributor arm 106 of distributor 86. Distributor arm 106 is driven by the engine and sequentially makes contact with terminals 108A–108F of distributor 86. Wires 110A–110F connect terminals 108A–108F with igniters 88A–88F, respectively. Igniters 88A–88F normally take the form of conventional spark plugs. While igniters 88A–88F are shown in FIG. 3 as located in a continuous row, it will be understood that they are associated with the cylinders of the engine in such a manner as to produce the desired firing sequence. Upon rotation of distributor arm 106, voltage induced in secondary winding 96 of ignition coil 80 is successively applied to the various igniters 88A–88F in the desired firing sequence.

As shown in FIG. 3, engine analyzer 10 interfaces with the engine ignition system through engine analyzer module 52, which includes engine analyzer analog section 52A and engine analyzer digital section 52B. Input signals are derived from the ingition system by means of Engine Ground connector 32, Points connector 36, Coil connector 40, Battery connector 44, HT secondary voltage probe 24, and No. 1 probe 28. In addition, a vacuum/pressure electrical input signal is produced by vacuum transducer 46, and a COMPRESSION input signal (derived from starter current) is produced by battery/starter tester module 64. These input signals are received by engine analyzer analog section 52A and are converted to digital signals which are then supplied to engine analyzer digital section 52B. Communication between engine analyzer module 52 and microprocessor 48, data memory 56, and DMA controller 58 is provided by engine analyzer digital section 52B through master bus 50. In addition, engine analyzer digital section 52B interfaces with timing light 20 through cable 22.

As illustrated in FIG. 3, Engine Ground connector 32 is connected to negative terminal 92 of battery 72, or other suitable ground on the engine. Points connector 36 is connected to terminal 100 of ignition coil 80, which in turn is connected to circuit interrupter 82. As discussed previously, circuit interrupter 82 may be conventional breaker points or a solid state switching device of a solid state ignition system. Coil connector 40 is connected to terminal 98 of coil ignition 80, and Battery connector 44 is connected to positive terminal 90 of battery 72. All four connectors 32, 36, 40 and 44 are, therefore, connected to readily accessible terminals of the ignition system, and do not require removal of conductors in order to make connections to the ignition system.

HT probe 24 is a conventional probe used to sense secondary voltage in conductor 104. Similarly, No. 1 probe 28 is a conventional probe used to sense current flow through wire 110A. In the example shown in FIG. 3, igniter 88A has been designated as the igniter for the "No. 1" cylinder of the engine. Both probe 24 and probe 28 merely clamp around existing conductors, and thus do not require removal of conductors in order to make measurements.

Figure 4:
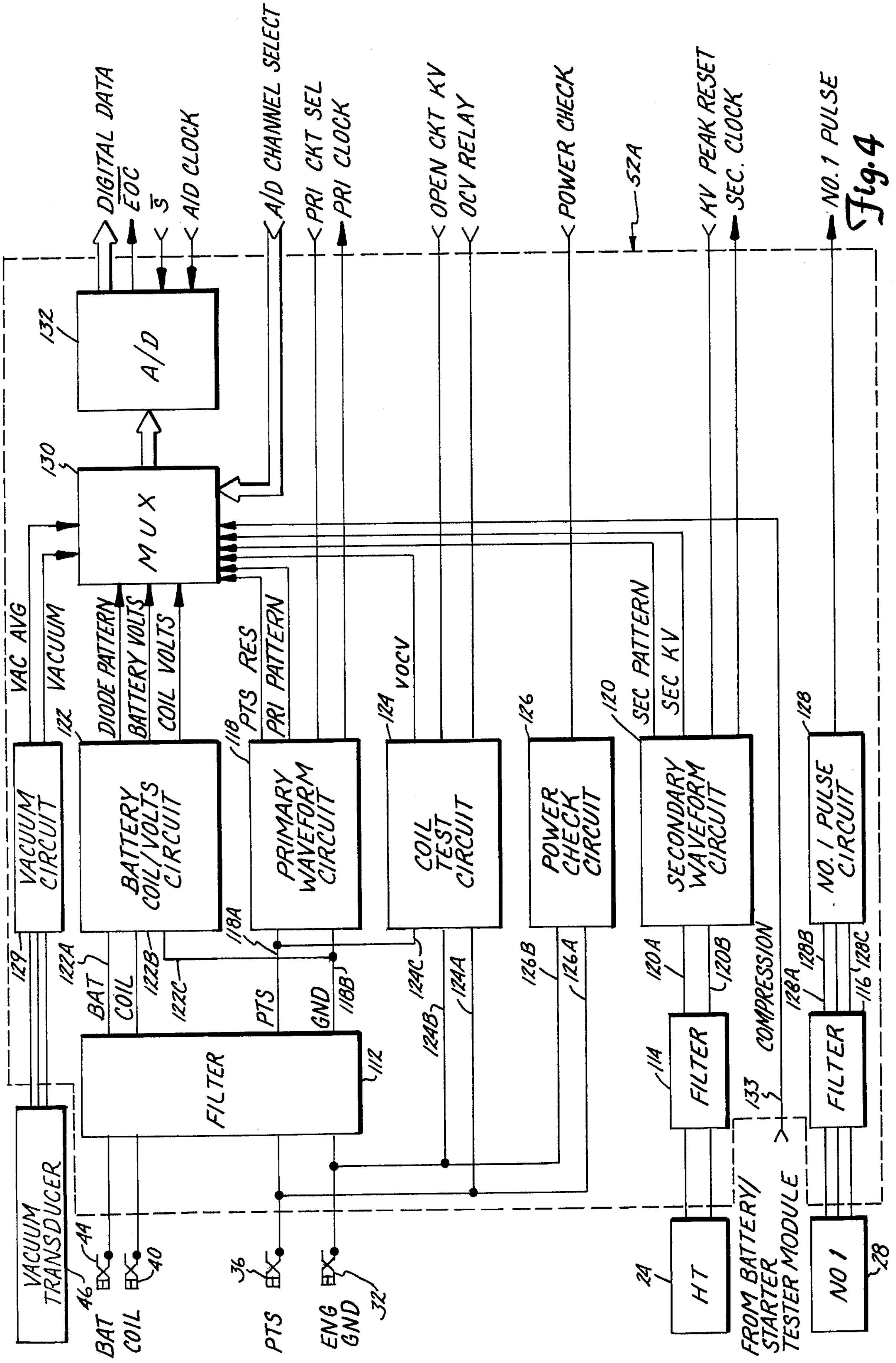
FIG. 4 is an electrical block diagram of the analog section of the engine analyzer module of FIG. 3.

FIG. 4 is an electrical block diagram showing engine analyzer analog section 52A, together with HT probe 24, No. 1 probe 28, Engine Ground connector 32, Points connector 36, Coil connector 40, Battery connector 44, and vacuum transducer 46. Analog section 52A includes input filters 112, 114, and 116, primary waveform circuit 118, secondary waveform circuit 120, battery coil/volts circuit 122, coil test circuit 124, power check circuit 126, No. 1 pulse circuit 128, vacuum circuit 129, multiplexer (MUX) 130, and analog-to-digital (A/D) converter 132. Analog section 52A supplies digital data, an end-of-conversion signal (EOC), a primary clock signal (PRI CLOCK), a secondary clock signal (SEC CLOCK), and a NO. 1 PULSE signal to engine analyzer digital section 52B. Analog section 52A receives an S signal, an A/D CLOCK signal, A/D CHANNEL SELECT signals, a primary circuit select signal (PRI CKT SEL), an OPEN CKT KV signal, an OCV RELAY signal, a POWER CHECK signal and a KV PEAK RESET signal from engine analyzer digital section 52B.

Points connector 36 and engine ground connector 32 are connected through filter circuit 112 to inputs 118A and 118B, respectively, of primary waveform circuit 118. Filter circuits 112, 114 and 116 are preferably inductive-capacitive filters which filter input signals to suppress or minimize the high frequency noise signals typically generated by the ignition system. Based upon the signal appearing at its inputs, 118A and 118B, primary waveform circuit 118 supplies a primary clock signal to digital section 52B, and also provides a primary pattern (PRI PATTERN) waveform and a points resistance (PTS RES) signal to multiplexer 130.

The primary clock (PRI CLOCK) signal is a filtered signal that is 180° out of phase with the primary signal appearing between Points connector 36 and Engine Ground connector 32. The PRI CLOCK signal is a square wave signal that is high during the time period when the circuit interrupter 82 is conductive and is low during the time when circuit interrupter 82 is non-conductive. In preferred embodiments of the present invention, primary waveform circuit 118 amplifies the primary signal appearing between Points connector 36 and Engine Ground connector 32, filters the amplified signal, and compares the amplified and filtered signal to a reference or threshold voltage. This reference or threshold voltage has two levels, which are selectable by the PRI CKT SEL signal supplied by digital section 52B. The PRI CKT SEL signal causes primary waveform circuit 118 to use one threshold voltage level when conventional breaker points are used as circuit interrupter 82, and a second threshold voltage when circuit interrupter 82 is a solid state type of circuit interrupter (such as a General Motors HEI solid state ignition system).

In preferred embodiments of the present invention, primary waveform circuit 118 includes circuitry to invert the primary ignition signal in the event that the primary ignition signal is a negative going signal, which occurs with vehicles equipped with the battery positive terminal at engine ground. As a result, the PRI CLOCK signal produced by primary waveform circuit 118 is unchanged, regardless of whether the vehicle has a positive or negative ground.

Primary waveform circuit 118 also supplies the PTS RES signal to multiplexer 130. This signal is an analog voltage which is representative of the dynamic points resistance connected to Points connector 36 during the time when the circuit interrupter 82 is conductive. Primary waveform circuit 118 includes an absolute value measurement circuit which compares the signal at input 118A with ground and supplies the PTS RES signal as an analog voltage. Although the absolute value circuit within primary waveform circuit 118 does not reject the signal at input 118A during the time when circuit interrupter 82 is non-conductive, microcomputer 48 is programmed, by virtue of the executive program stored in memory 54, to restrict the acceptable values of the PTS RES signal to the time period when circuit interrupter 82 is conductive, thereby producing a valid reading of dynamic points resistance. The conductive and nonconductive times of circuit interrupter 82 are determined by microcomputer 48 from either the PRI CLOCK signal or the SEC CLOCK signal.

Primary waveform circuit 118 also produces the primary pattern (PRI PATTERN) signal. This is derived from the signal appearing at input 118A, and is supplied to multiplexer 130. Primary waveform circuit 118 includes circuitry to reduce the primary waveform appearing at points connector 36 to 1/50th of its original value by means of a voltage divider. In the preferred embodiment of the present invention, primary waveform circuit 118 determines whether the ignition signal is derived from a positive or a negative grounded system, and selectively causes inversion of the primary ignition signal, so that the PRI PATTERN signal supplied to multiplexer 130 is a positive going signal regardles of whether the vehicle has a positive or negative ground.

The secondary voltage sensed by HT probe 24 is supplied through filter 114 to inputs 120A and 120B of secondary waveform circuit 120. The secondary voltage is reduced by a capacitive divider by a factor of 10,000, is supplied through a protective circuit which provides protection against intermittent high voltage spikes, and is introduced to three separate circuits. One circuit supplies the SEC CLOCK signal; a second circuit supplies a secondary pattern (SEC PATTERN) waveform to multiplexer 130, and a third circuit supplies the SEC KV signal to multiplexer 130.

The SEC CLOCK signal is a negative going signal which occurs once for each secondary ignition signal pulse, and has a duration of approximately 1 millisecond. The inverted secondary voltage signal is amplified and is used to drive two cascaded one-shot multivibrators (not shown).

The second circuit is a voltage follower circuit which derives the SEC PATTERN waveform from the inverted secondary voltage.

The third circuit within secondary waveform circuit 120 is a peak detector circuit in which the peak voltage value of the secondary voltage is stored and supplied as the SEC KV signal. The KV PEAK RESET signal supplied by digital section 52B is used to reset the SEC KV signal to zero, so that a new measurement of the peak secondary ignition signal can be made. This process is typically repeated, with the result being a series of peak pulse secondary KV values which correspond in value to the peaks of the secondary voltage waveform.

The signal from No. 1 voltage probe 28 is supplied through inductive-capacitive type filter 116 to inputs 128A–128C of No. 1 pulse circuit 128, where it is filtered, amplified, and used to drive a pair of cascaded one-shot multivibrators (not shown). The resulting NO. 1 PULSE output signal of No. 1 pulse circuit 128 is a positive going pulse of 1 millisecond duration that corresponds in time to the ignition pulse supplied to the No. 1 igniter 88A (FIG. 3).

Battery coil/volt circuit 122 has inputs 122A, 122B and 122C which receive the BAT, COIL and GND inputs, respectively, from filter 112. Battery coil/volt circuit 112 provides three output signals (DIODE PATTERN, BATTERY VOLTS, and COIL VOLTS) to multiplexer 130.

Inputs 122A and 122C to battery coil/volt circuit 122 are AC coupled to an amplifier/filter circuit (not shown) within battery coil/volt circuit 122. The signal appearing between inputs 122A and 122C is a low level diode ripple signal, which is amplified and filtered and is supplied to multiplexer 130 as the DIODE PATTERN signal.

The voltage level at the input 122A is applied to a resistor/capacitor network (not shown), is buffered, and supplied to an absolute value circuit (not shown) to form the BATTERY VOLTS output signal of circuit 122. The BATTERY VOLTS signal is a positive voltage level output regardless of whether the vehicle under test has a positive or negative grounded battery terminal.

The signal at input 122B to battery coil/volt circuit 122 goes to a similar resistive/passive network buffer and amplifier (not shown) within circuit 122 to produce a positive voltage level output, which is labeled as the COIL VOLTS signal supplied by battery coil/volts circuit 122 to multiplexer 130.

Coil test circuit 124 measures the condition of ignition coil 80 to determine if the primary ignition circuit and coil 80 are in good condition. In the embodiment illustrated in FIG. 4, this is achieved without opening the circuit between terminal 102 of coil 80 and one of the igniters 88A–88F (shown in FIG. 3), as has been the typical practice in measuring coil condition in the past. This embodiment of coil test circuit 124 is described in further detail in the previously mentioned copending application Ser. No. 327,733 by J. Marino, M. Kling, S. Roth, and S. Makhija, entitled "Ignition Coil Test Apparatus", which is assigned to the same assignee as the present invention. Coil test circuit 124 has terminals 124A and 124B connected to points connector 36 and engine ground connector 32, respectively, and has terminal 124C connected to the PTS output of filter 112. In addition, coil test circuit 124 receives the OPEN CKT KV and the OCV RELAY signals from digital section 52B, and provides an output circuit voltage signal ($V_{OCV}$) to multiplexer 130.

Analog section 52A also includes power check circuit 126, which has terminals 126A and 126B connected to Points connector 36 and Engine Ground connector 32, respectively. When power check circuit 126 is activated by the power check signal from digital section 52B, it effectively applies a low resistance between Points connector 36 and Engine Ground connector 32. This in effect shorts out circuit interrupter 82 and inhibits the production of a secondary ignition signal to be applied to one of the igniters 88A–88F. The power check function provided by power check circuit 126 is, therefore, generally similar to the power check function provided in other engine analyzer systems, in that selected igniters 88A–88F are disabled to determine whether the absence of that particular igniter (or igniters) significantly affects the operation of the internal combustion engine. If a particular igniter is disabled and the speed (r.p.m.) of the internal combustion engine remains relatively unchanged, this indicates that the igniter is ineffective and should be readjusted or replaced.

The electrical input signal from vacuum transducer 46 is supplied to vacuum circuit 129. The input signal is amplified to produce a VACUUM signal, which is an instantaneous waveform varying as a function of sensed vacuum or pressure. In addition, the input signal is integrated to produce a VAC AVG signal, which represents an average signal level of the input signal. Both the VACUUM signal and the VAC AVG signal are supplied to multiplexer 130.

A COMPRESSION signal is supplied on line 133 to multiplexer 130. The COMPRESSION signal is an analog waveform signal derived from starter current, processed by battery/starter tester module 64, and then delivered to analog section 52A on line 133.

As shown in FIG. 4, multiplexer 130 receives the PTS RES and PRI PATTERN signals from primary waveform circuit 118, the SEC PATTERN and SEC KV signals from secondary waveform circuit 120, the DIODE PATTERN, BATTERY VOLTS and COIL VOLTS signals from battery coil/volt circuit 122, the $V_{OCV}$ signal from coil test circuit 124, the VACUUM and VAC AVG signals from vacuum circuit 129, and the COMPRESSION signal from line 133. Each of these signals is an analog signal, which is selectively supplied by multiplexer 130 to A/D converter 132. The particular analog signal supplied to A/D converter 132 is determined by the A/D CHANNEL SELECT signals supplied to multiplexer 130 by digital section 52B. In a preferred embodiment, the A/D CHANNEL SELECT signals are supplied on four digital control lines, thus giving a total of sixteen different channels which can be selected. Based upon the particular channel selected, multiplexer 130 supplies one of the analog input signals to A/D converter 132 for conversion.

A/D converter 132 is a high speed analog-to-digital converter which is enabled by the S signal from digital section 52B and provides data conversions at a rate determined by the A/D CLOCK signal supplied from digital section 52B.

A/D converter 132 samples the input signal at the rate determined by A/D CLOCK signal and supplies digital data to digital section 52B. In a preferred embodiment, if a waveform is to be digitized A/D converter 132 samples the input signal five hundred twelve times. This produces a total of five hundred twelve digitized points on a waveform, which permits an accurate reconstruction of the waveform on raster scan display 14.

Figure 5:
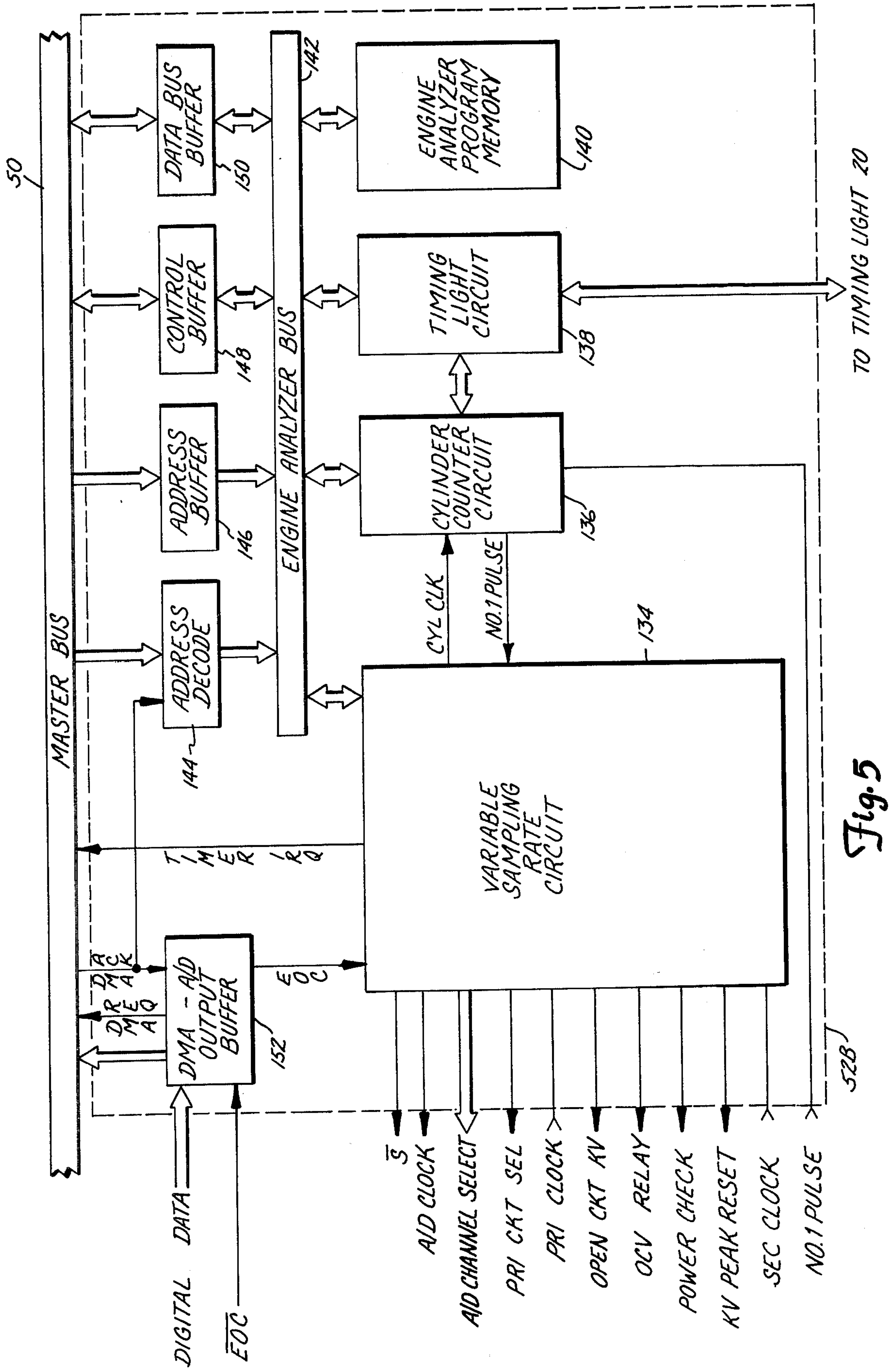
FIG. 5 is an electrical block diagram of the digital section of the engine analyzer module of FIG. 3.

FIG. 5 is an electrical block diagram of digital section 52B of engine analyzer module 52. Digital section 52B includes variable sampling rate circuit 134, cylinder counter circuit 136, timing light circuit 138 and engine analyzer program memory 140, all of which are connected to engine analyzer bus 142. In preferred embodiments of the present invention, engine analyzer bus 142 includes digital data lines, address lines and control lines. Interface between digital section 52B and the remaining circuitry of engine analyzer 10 is provided by means of master bus 50. Address decode circuit 144, address buffer circuit 146, control buffer circuit 148, data bus buffer circuit 150, and DMA-A/D output buffer circuit 152 provide an interface between master bus 50 and the remaining circuitry of digital section 52B.

Variable sampling rate circuit 134 receives the PRI CLOCK and SEC CLOCK signals from analog section 52A, and provides the various control signals to analog section 52A which determine the particular test being performed and the particular digital data which is received from analog section 52A. These control signals include the S and A/D CLOCK signals supplied to A/D converter 132, the A/D CHANNEL SELECT signal supplied to multiplexer 130, the PRI CKT SEL signal supplied to primary waveform circuit 118, the OPEN CKT KV and OCV RELAY signals supplied to coil test circuit 124, the POWER CHECK signal supplied to power check circuit 126 and the KV PEAK RESET signal supplied to secondary waveform circuit 120. Variable sampling rate circuit 134 produces the CYL CLK signal, which is based upon either the PRI CLOCK or the SEC CLOCK signal and supplies this signal to cylinder counter circuit 136. The CYL CLK signal is also used by variable sampling rate circuit 134 to determine the period of the primary or secondary waveform. Variable sampling rate circuit 134 supplies this period measurement to microprocessor 48 via engine analyzer bus 142 and master bus 150. Based upon this period measurement, microprocessor 48 selects the desired data sample rate to be used by A/D converter 132, and supplies control signals to variable sampling rate circuit 134 via master bus 150 and engine analyzer bus 142. The data sample rate is controlled by variable sampling rate circuit 134 by means of the A/D CLOCK signal. Variable sampling rate circuit 134 also receives the EOC signal from DMA-A/D output buffer 152 and the NO. 1 PULSE signal from cylinder counter circuit 136.

In many of the test functions performed by engine analyzer module 52, it is necessary to determine the current cylinder number at various points in time. These engine tests include waveform displays, power check test and timing measurements. Keeping track of cylinder number by using microprocessor 48 becomes inconvenient, particularly when microprocessor 48 is involved in digitizing waveforms, and in reconstructing waveforms for display on raster scan display 14. In the preferred embodiment shown in FIG. 5, cylinder counter circuit 136 performs this cylinder number function. Cylinder counter circuit 136 includes a presettable counter which is loaded with the number of cylinders of the engine under test by data supplied from microprocessor 48 through master bus 50, data bus 150 and engine analyzer bus 142. The number of cylinders of the engine under test is typically supplied to microprocessor 48 through user interface 16.

Cylinder counter circuit 136 counts in response to the CYL CLK signal. The current count of cylinder counter circuit 136 is provided both to the engine analyzer bus 142 and to timing light circuit 138.

The NO. 1 PULSE signal from analog section 52A is supplied to cylinder counter circuit 136. At the beginning of operation of engine analyzer module 52, the first pulse of the NO. 1 PULSE signal presets cylinder counter circuit 136 and thereby synchronizes it to the engine. After that, the No. 1 probe 28 can be removed and the NO. 1 PULSE signal discontinued, and cylinder counter circuit 136 will still remain in synchronization with the engine as long as the CYL CLK signal continues to be supplied. Cylinder counter circuit 136 also is capable of operation without the NO. 1 PULSE signal, and in that case is synchronized to the engine operation by manual inputs supplied by the operator either through use interface 16 or control switches on timing light 20. In this case, the synchronization pulse is supplied through engine analyzer bus 142 to cylinder counter circuit 136, rather than from the NO. 1 PULSE signal.

Timing light circuit 138 controls operation of timing light 20, based upon control signals from microcomputer 48, the cylinder count from cylinder counter circuit 136, and operator input signals supplied from control switches on timing light 20.

In the preferred embodiment shown in FIG. 5, the operation of engine analyzer module 52, under the control of microprocessor 48, is based upon a stored engine analyzer program stored in engine analyzer program memory 140. When the operator selects, through user interface 16, a test function involving engine analyzer module 52, microprocessor 48 interrogates engine analyzer module 52 to determine that it is present in the system, and addresses engine analyzer program memory 140 for the operating instructions required for that particular test. In preferred embodiments of the present invention, each test module such as engine analyzer module 52, exhaust analyzer module 62, and battery/-starter tester module 64 (FIG. 2) has its own associated program memory. As a result, only that memory capacity required for the particular test modules being used is provided.

As discussed previously, transfer of digital data from A/D converter 132 to data memory 56 is provided by DMA controller 58. Digital data from A/D converter 132 is supplied to DMA-A/D output buffer 52. When A/D converter 132 supplies an EOC signal to output buffer 152, a DMA request (DMA REQ) signal is supplied by output buffer 52 to master bus 50. DMA converter 58 then takes control of master bus 50 and supplies a DMA acknowledge (DMA ACK) signal to output buffer 152. The digital data from A/D converter 132 is then supplied by output buffer 52 onto master bus 50. DMA controller 58 supplies the addresses to put the individual bytes of data into proper memory locations within data memory 56. DMA controller 58 has the initial address of the first byte of data to be stored (which depends upon the particular test being performed) and the number of bytes of data to be stored. As each byte of data is transferred from output buffer 152 to data memory 56, DMA controller 58 changes the addresses, and keeps track of the number of bytes which have been stored. When the predetermined number of bytes of data have been transferred, DMA controller 58 relinquishes control of master bus 50 to microprocessor 48, and the data transfer to data memory 56 ceases, even if A/D converter 132 is continuing to sample and convert the particular input signal from multiplexer 130 to digital data.

In the preferred embodiment shown, a constant width waveform display on raster display 14 regardless of the speed (RPM) of the engine under test. This constant width display feature is the subject of the previously mentioned U.S. Pat. No. 4,399,407 entitled ENGINE ANALYZER WITH CONSTANT WIDTH DIGITAL WAVEFORM DISPLAY. In the case of an ignition waveform, such as a primary or secondary waveform signal for a single cylinder of the engine, the period P of that waveform changes with the engine RPM. This creates a problem in displaying a full width waveform based upon digitized data from A/D converter 132, since the number of data samples N and the data sample rate R are related to the period P of the waveform by the following relationship:

$$P=N/R \qquad \text{Equation 1}$$

As engine RPM changes, either N or R (or both) must be changed to ensure that no more or less than one waveform period is stored.

Changing the number of data samples N has several disadvantages. First, memory space in data memory 56 is inefficiently utilized, since adequate memory space must be provided for the largest period possible. When higher engine speeds are encountered, the period P of the waveform will be shorter, and only a portion of the memory space will be used. Since memory is relatively expensive, the inefficent use of memory space is undesirable.

Second, timing is greatly complicated by changing the number of data samples N. Raster scan display 14 normally displays a fixed number of points, and changing to a variable number of points greatly complicates the control of operation of raster scan display 14.

In the preferred embodiment described in this application, the number of data samples N is maintained constant, while the data sample rate of A/D converter 132 is varied by variable sampling rate circuit 134 to accommodate changes in the engine RPM. Variable sampling rate circuit 134, under the control of microprocessor 48, varies data sample rate R as a function of period P so as to maintain the number of data samples N constant (in the preferred embodiment N=512). This embodiment of the present invention has several important advantages. First, since N is constant, memory space within data memory 56 is used efficiently. Second, system timing is simplified, particularly with respect to operation of raster scan display 14.

Figure 6:
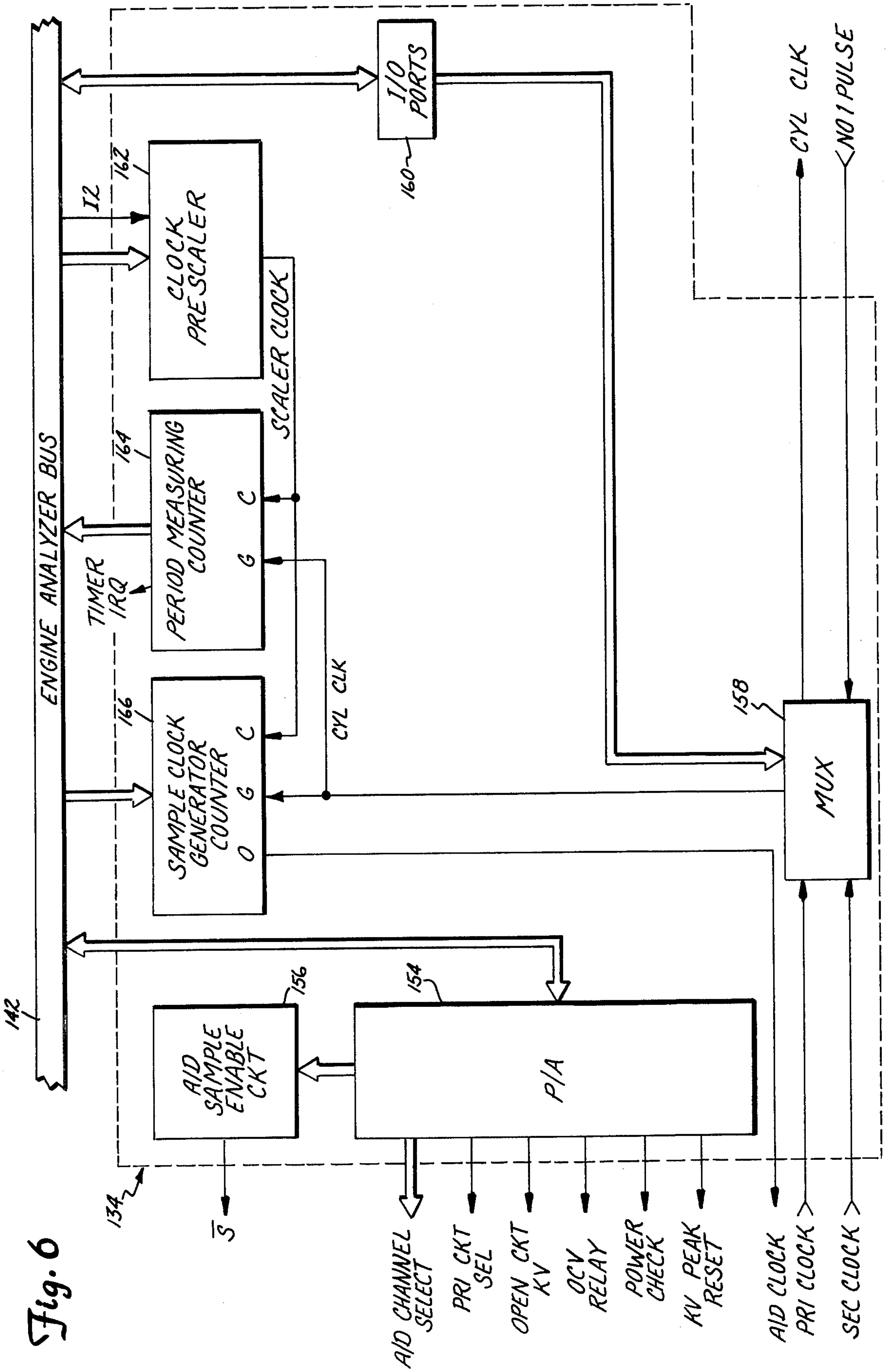
FIG. 6 is an electrical block diagram of a variable sample rate circuit of the digital section shown in FIG. 5.

FIG. 6 is a block diagram showing variable sampling rate circuit 134 and engine analyzer bus 142. Variable sampling rate circuit 134 includes programmable interface adapter (PIA) 154, A/D sample enable circuit 156, multiplexer 158, input/output (I/O) ports 160, clock prescaler 162, period measuring counter 164, and sample rate generator counter 166.

PIA 154 is controlled by microprocessor 48 (FIG. 2) via engine analyzer bus 142. Through PIA 154 and A/D enable circuit 156 (which is controlled by PIA 154), microprocessor 48 produces the S, A/D CHANNEL SELECT, PRI CKT SELECT, OPEN CKT KV, OCV RELAY, POWER CHECK and KV PEAK RESET signals.

Multiplexer 158 receives the PRI CLK and SEC CLK signals from analog section 52A and the NO. 1 PULSE signal from cylinder counter circuit 136. Multiplexer 158 supplies one of these signals to the gates of sample clock generator counter 166 and period measuring counter 164 based upon an input signal supplied by I/O ports 160 under the control of microprocessor 48. When either the PRI CLK signal or the SEC CLK signal is supplied, this signal is the CYL CLK signal, which is also supplied to cylinder counter circuit 136.

Clock prescaler 162 receives data from engine analyzer bus 142 which selects a frequency for its SCALER CLOCK output signal. Clock prescaler 162 also receives a clock signal Ø2 from engine analyzer bus 142, which is preferably on the order of 1 MHz. Microprocessor 48 selects, by the scaling factor supplied to clock prescaler 162, either the 1 MHz frequency of the Ø2 signal or some lower frequency for the SCALER CLOCK signal frequency.

The SCALER CLOCK signal is supplied to the clock (C) input of period measuring counter 164. The period of the input waveform, which is represented by the CYL CLK signal supplied to the gate (G) input of period measuring counter 164, is measured by counting the SCALER CLOCK pulses while the period measuring counter 164 is gated on by the CYL CLK signal. When the measurement of period has been completed, period measuring counter 164 generates a TIMER IRQ interrupt signal which is supplied to microprocessor 48 via master bus 50. The digital value representing the measured period is then transferred from period measuring counter 164 to microcomputer 48 via engine analyzer bus 142, data bus buffer 150, and master bus 50. If period measuring counter 164 has overflowed, or if the count is so small that the desired number of samples N will not be produced using that particular SCALER CLOCK frequency, microprocessor 48 adjusts the scaling factor used by clock prescaler 162, and a new measurement is taken. Clock prescaler 162, therefore, is effectively a range selection device which provides a lower SCALER CLOCK frequency for use at low engine RPM and a higher SCALER CLOCK frequency for use at higher engine RPM.

The measured period value from period measuring counter 164 is actually a count of SCALER CLOCK cycles that occur during one period of the input waveform to be digitized. Microprocessor 48 divides this value by N (the number of data points to be stored per period) and then loads the quotient Q into sample clock generator counter 166. The SCALER CLOCK signal from clock prescaler 162 is supplied to the clock (C) input of sample clock generator 166, and the CYL CLK signal is supplied to the gate (G) input of sample clock generator counter 166. The output (O) of sample clock generator counter 166 is the A/D CLOCK signal which determines the sample rate R of A/D converter 132. Sample clock generator counter 166 produces a A/D CLOCK pulse at its output every Q counts after having been enabled by the CYL CLK signal. Therefore N samples are taken in one waveform period.

The resulting data sample rate R produced by sample clock generator counter 166 is inversely proportional to the input waveform period P, and therefore the number of samples N remains constant despite changes in engine RPM. In the embodiment shown in FIG. 6, period measuring counter 164 produces a period count K according to the following relationship:

$$K=PC \quad \text{Equation 2}$$

where C=SCALER CLOCK rate

The quotient Q computed by microprocessor 48 and supplied to sample clock generator counter 166 is given by the following relationship:

$$Q=K/N=PC/N \quad \text{Equation 3}$$

Sample clock generator counter 166 produces an A/D CLOCK sample pulse every Q cycles of the SCALER CLOCK signal. Therefore:

$$R=C/Q=C/PC/N=N/P \quad \text{Equation 4}$$

Equation 4 corresponds to Equation 1 above. The system of FIG. 6, therefore generates the A/D CLOCK signal at a rate R which will produce the desired number N of data samples to achieve a constant width waveform on raster scan display 14 despite changes in the period of the input waveform to be digitized.

The operation of engine analyzer 10 in digitizing and displaying a constant width simulated waveform can be further understood by the following example. In this example, it will be assumed that a primary waveform for the No. 1 cylinder is to be digitized and displayed. It should be understood, however, that the same process is performed for any of the various cylinders, and for other waveforms such as the secondary waveforms.

When the operator selects a primary waveform for the No. 1 cylinder, microprocessor 48 first measures the period of the waveform of the No. 1 cylinder by means of clock prescaler 162 and period measuring counter 164. Microprocessor 48 selects the PRI CLOCK signal to be supplied through multiplexer 158 to the gate (G) input of period measuring counter 164. Cylinder counter circuit 136 indicates when the No. 1 cylinder waveform is present.

Once microprocessor 48 has performed the period measurement routine and has set the clock prescaler 162 and sample clock generator counter 166 with proper values, it also sets up PIA 154 so that when cylinder counter circuit 136 reaches the proper cylinder, A/D sample enable circuit 156 will provide the S signal which enables A/D converter 132 to begin conversion.

Microprocessor 48 also sets up DMA controller 58 (FIG. 2) so that the waveform being digitized will be stored in the right location within data memory 56 (FIG. 2). In particular, microprocessor 48 sets up two registers (not shown) within DMA controller 58. One register is an address register which gives DMA controller 58 the address in data memory 56 for the first byte of digital data of the waveform. The second register is a count register which is set to five hundred twelve so that DMA controller 58 will transfer five hundred twelve bytes to data memory 56.

Once a setting up of sample rate and of DMA controller 58 has been completed, microprocessor 48 goes on to other tasks, and leaves the A/D conversion process alone. When the proper cylinder is attained by cylinder counter circuit 136, A/D sample enable circuit 156 supplies the $\bar{S}$ signal which starts A/D converter 132. At the end of each conversion, A/D converter 132 sends an $\overline{EOC}$ signal back through DMA-A/D output buffer 152 to DMA controller 58, which takes the results of the conversion and stores it in data memory 56. This process occurs in an interleaved fashion with the other operations of microprocessor 48. DMA controller 58 operates in a "cycle stealing mode" in which it steals some clock cycles from microprocessor 48 during which it takes control of master bus 50 and transfers data directly from engine anaylyzer module 52 to data memory 56. While this process is occurring, microprocessor 48 is performing other functions, particularly drawing a waveform which was digitized for a previous cylinder. This cycle stealing mode allows the entire operation to be faster, since microprocessor 48 does not get involved in the digitizing process, and can be performing other functions while the A/D conversion and storage process is being performed.

Microprocessor 48 then begins drawing the simulated primary waveform the No. 1 cylinder. The 512 bytes representing the No. 1 primary waveform are retrieved from data memory 56. Microprocessor 48 puts the first point on display screen 14A (by supplying the appropriate digital control signal to display memory 60), puts the second point on the screen, and draws a line between the first and second points. Microprocessor 48 then puts a third point on the screen and draws a line from the second to the third point. This process is continued until all 512 points have been placed on screen 14A, with the interconnecting lines between adjacent points.

In a preferred embodiment of the present invention, microprocessor 48 saves the waveform that is on screen 14A while writing a new waveform. As each new point and line is drawn, the corresponding point and line of the previous waveform is erased. In other words, the previous waveform is being progressively erased as the new waveform is being progressively written across screen 14A. This provides a smooth transition between one display waveform to the next, and eliminates a flickering effect which would otherwise be produced if the entire screen 14A were erased before the next waveform was written.

The present invention permits a wide variety of different waveform display modes. Because the display of the waveforms is based upon stored digital data, rather than being based on real time analog signals, display modes are possible with the present invention which are not presently available or extremely difficult to obtain on prior art analog systems.

Figure 7:
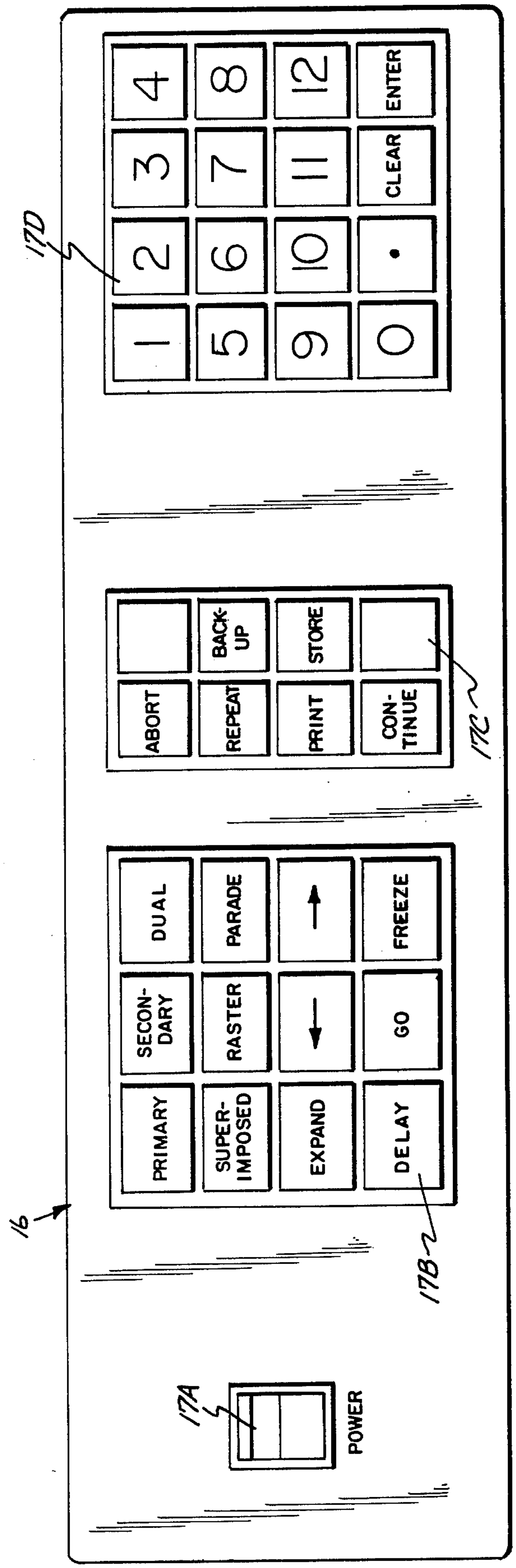
FIG. 7 shows a portion of user interface which includes control switches for selecting information to be displayed.

FIG. 7 shows a portion of user interface 16 which includes switches for selecting various display modes. As shown in FIG. 7, user interface 16 includes POWER switch 17A, and three groups of push button switches or keys 17B, 17C and 17D. Keys 17B and 17D are the keys primarily concerned with the waveform display function. The following discussion, therefore, will be concerned with the use and operation of these switches.

Keys 17B include a total of twelve keys having the following legends: PRIMARY, SECONDARY, DUAL, SUPERIMPOSED, RASTER, PARADE, EXPAND, ←, →, DELAY, GO and FREEZE. Keys 17C include keys having the following legends: ABORT, REPEAT, BACK-UP, PRINT, STORE and CONTINUE. Keys 17D include numerical keys 0 through 12, a decimal point ".", CLEAR and ENTER.

In addition to the control switches and keys shown in FIG. 7, user interface 16 also preferably includes alphanumeric keyboard 17E (shown in FIG. 1). By use of keyboard 17E and switches 17B, 17C and 17D the operator can select the function to be performed, designate the specifications of the engine under test, and select the waveforms or other information to be displayed by display 14.

Microprocessor 48 provides prompting messages to the operator through raster scan display 14. Using these prompting messages, the selection of functions, specifications and information to be displayed is performed through keys and switches 17A–17E of user interface 16.

When the operator desires to view primary waveforms, the engine analyzer module 52 is the module selected during the selection of functions. Once the engine analyzer module 52 has been selected as the particular module, microprocessor 48 causes raster scan display 14 to display a menu of various tests to be performed. These tests preferably include a group of tests upon combinations of primitive tests. When the operator selects a primary waveform test from the menu, it causes microprocessor 48 to initiate the primary waveform digitizing function. The primary waveforms for each of the cylinders are digitized and stored continuously in data memory 56.

Figure 8:
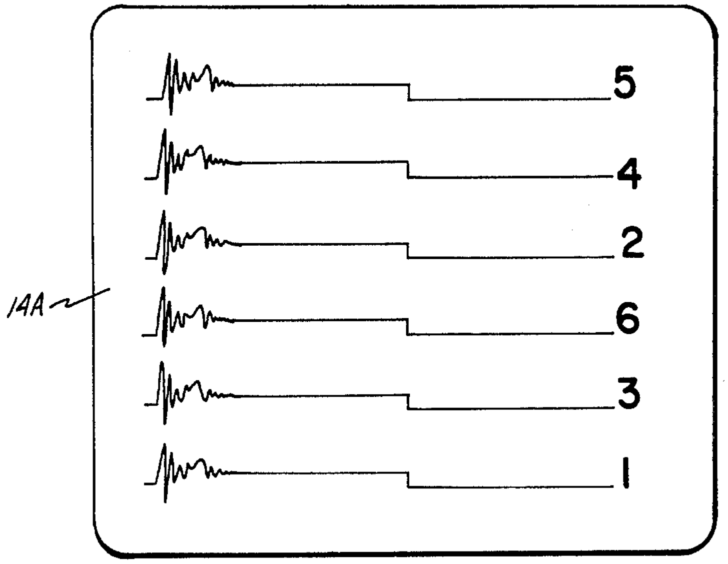
FIG. 8 illustrates a raster display mode in which various selected primary waveforms are simultaneously displayed.

The operator then selects the waveform display mode and, by using the PRIMARY key, can select the primary waveform display format. The particular cylinders for which the primary waveform is to be displayed may be selected by use of keys 17D. One or more waveforms may be displayed. If only a single primary waveform is to be displayed, the user identifies that waveform by pressing the PRIMARY key and the appropriate numerical key from among keys 17D. If more than one primary waveform is to be displayed simultaneously in a "raster" type display, the operator further identifies this by depressing the RASTER key from among keys 17B. FIG. 8 illustrates a raster display mode in which several primary waveforms are displayed. As shown in FIG. 8, the display preferably includes an adjacent alphanumeric designation of the particular cylinders associated with the primary waveforms being displayed.

Figure 9:
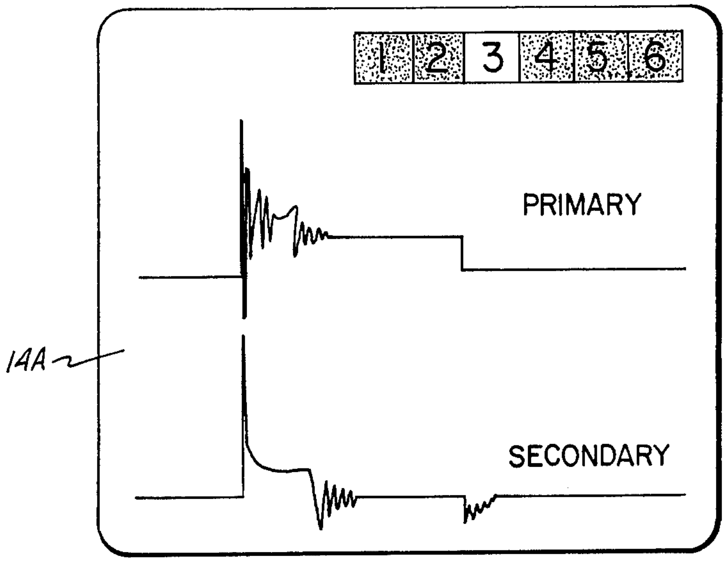
FIG. 9 illustrates a dual display mode in which primary and secondary waveforms of the same cylinder are simultaneously displayed.

In another display mode, both a primary waveform and a secondary waveform for the same cylinder are simultaneously displayed. This "dual" display mode is illustrated in FIG. 9. The operator selects the dual mode by use of the DUAL key from keys 17B, and selects the particular cylinder by use of the numerical keys 17D. In FIG. 9, the primary and secondary waveforms for No. 3 cylinder are being displayed.

The dual display mode illustrated in FIG. 9 is particularly advantageous, since it allows the operator to observe both the primary and secondary waveforms for the same cylinder. This is a display mode which has not been available on prior art real time analog engine analyzer displays.

In the preferred embodiment of the present invention, the operator can "expand" or "contract" the portion of the waveform being displayed by input signals supplied through user interface 16. In particular, the EXPAND key is used in conjunction with the two keys (← and →) bearing arrows. The effect of the EXPAND key is to take the operation of the system out of a period measuring operation to determine the quotient Q supplied to sample clock generator counter 166. When the EXPAND key and the → key are actuated, microprocessor 48 expands the beginning of the waveform by decreasing the quotient Q supplied to sample clock generator counter 166. This in effect increases the rate R of A/D CLOCK signal and thus causes the predetermined number N of data samples to be completed before the end of the period of the waveform. The resolution of the portion of the waveform stored and later displayed is thus increased, since the frequency of the A/D CLOCK signal is increased. Similarly, to contract the waveform in response to the ← key, microprocessor 48 increases the quotient Q and thus decreases the rate R of the A/D CLOCK signal.

Figure 10:
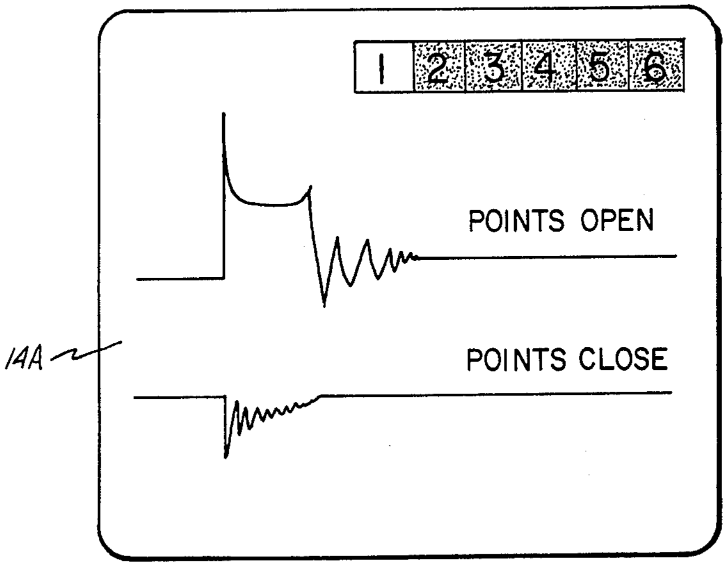
FIG. 10 illustrates a display mode in which "points open" and "points close" time intervals of a primary waveform are displayed in expanded form.

At low engine RPM, a large portion of a single cylinder waveform is often useless information. The most useful information portions of the waveform occur when circuit interrupter 82 switches to a nonconductive state ("points open") and when circuit interrupter 82 switches to a conductive state ("points close"). FIG. 10 shows an alternative mode of displaying a primary or secondary waveform which provides high resolution of those portions of the waveform which are most important to the operator. In FIG. 10, the secondary waveform of cylinder No. 1 has been displayed in two parts. The upper waveform, which is designated "points open" corresponds to the portion of the primary waveform of cylinder No. 1 surrounding the time interval during which circuit interrupter 82 switches to the nonconductive state. The lower waveform, designated "points close" is a visual representation of a digitized waveform representing a time interval during which circuit interrupter 82 switches to a conductive state. Because the waveforms are digitized and stored, two segments of the same waveform can be digitized, stored, and later displayed in the unique format shown in FIG. 10. In this unique display mode, the important portions of the primary waveform are displayed as full width waveforms, each being formed from a total of 512 individual data samples. Thus far greater resolution is provided using the display mode illustrated in FIG. 10 than is possible if the entire waveform, including the portions having little or no useful information, is digitized.

The engine analyzer of the present invention provides great flexibility both as to the particular waveforms which are digitized and later displayed, and in the manner in which the waveforms are subsequently displayed on raster scan display 14. Because the waveforms displayed on raster scan display 14 are reconstructed simulated waveforms based upon previously stored digital data in data memory 56, a wide variety of waveform display formats are possible with the engine analyzer of the present invention. In some cases, similar display formats are not possible with real time analog displays.

Although the present invention has been described with reference to preferred embodiments, workers skilled in the art will recognize that changes may be made in form and detail without departing from the spirit and scope of the invention.

What is claimed is:

1. A test system for testing operation of a selected system or component of a multicylinder internal combustion engine, the test system comprising:

means for providing a periodic analog electrical input waveform representative of operation of the selected system or component of the internal combustion engine under a test condition, the analog input waveform having a period which varies with engine speed;

analog-to-digital (A/D) converter means for sampling the analog input waveform periodically and converting each sample to a digital sample value which represents magnitude of the waveform at a time when the sample was taken;

data memory means for storing the digital sample values;

means for selecting a test to be performed;

means for maintaining a cylinder count based upon a signal derived from the engine;

means for supplying a signal to the A/D converter means to initiate sampling of the analog input waveform by the A/D converter means as a function of the test selected and the cylinder count;

means for transferring a predetermined number of the digital sample values representative of the input waveform from the A/D converter means to selected locations in the data memory means based upon the test selected;

means for selecting a display mode;

means for converting stored digital sample values to display data based upon the display mode selected; and display means for displaying a simulated analog visual representation of the magnitude of the input waveform as a function of time based upon the display data.

2. The test system of claim 1 wherein the display means includes display memory means for storing the display data and a point adressable display for displaying the visual representation based upon the stored display data.

3. The test system of claim 1 and further comprising: means for providing to the means for transferring the digital sample values, based upon the test selected, a signal indicative of an initial address of the data memory means for storing the digital sample values and a signal indicative of the predetermined number of digital sample values to be transferred.

4. The test system of claim 1 wherein the A/D converter means provides an end-of-conversion signal upon completion of converting each sample to a digital value, and wherein the means for transferring transfers each digital value to a different selected memory location in the data memory means, beginning with the initial address, until the predetermined number of digital values have been transferred.

5. The test system of claim 1 wherein the means for providing a periodic analog input waveform includes:

primary waveform circuit means for deriving from an ignition system of the engine a primary analog input waveform for each cylinder of the engine; and secondary waveform circuit means for deriving from the ignition system a secondary analog input waveform for each cylinder of the engine.

6. The test system of claim 5 wherein the means for converting comprises: means for retrieving from the data memory means, in response to selection of a first display mode, stored first and second sets of digital sample values corresponding to a primary analog input waveform and a secondary analog input waveform for a selected cylinder; and means for converting the digital sample values retrieved to display data which cause the display means to display simultaneously both a simulated analog visual representation of the primary analog input waveform for the selected cylinder based upon the first set of the digital sample values and a simulated analog visual representation of the secondary analog input waveform for the selected cylinder based upon the second set of the digital sample values.

7. The test system of claim 5 wherein the means for converting comprises: means for retrieving from the data memory means, in response to selection of a second display mode, stored sets of digital sample values corresponding to primary analog input waveforms of selected cylinders; and means for converting the digital sample values retrieved to display data which cause the display means to display simultaneously simulated analog visual representations of primary analog input waveforms for the selected cylinders.

8. The test system of claim 5 wherein the means for converting comprises: means for retrieving from the data memory means, in response to selection of a third display mode, stored sets of digital sample values corresponding to secondary analog input waveforms of selected cylinders; and means for converting the digital sample values to display data which cause the display means to display simultaneously simulated analog visual representations of secondary analog input waveforms for the selected cylinders.

9. The test system of claim 5 and further comprising means responsive to the means for selecting a display mode for causing the display means to display a visual representation of an alphanumerical designation of a cylinder with which the simulated analog visual representation of an input waveform is associated.

10. A test system for testing operation of a selected system or component of a multicylinder internal combustion engine, the test system comprising:

means for providing a plurality of periodic analog waveform signals representative of operation of systems or components of the internal combustion engine, the analog waveform signals having periods which vary as a function of engine speed;

input means for providing an input signal selecting a test to be performed;

means for providing a count representing a currently operating cylinder of the engine;

digitizing means for digitizing a selected analog input signal during a time interval based upon the input signal and the count to produce a plurality of digital sample values representing magnitude of the selected signal as a function of time;

data memory means for storing the digital sample values in selected memory locations based upon the input signal;

display control means for providing display data based upon the digital sample values; and display means for displaying a simulated analog visual representation of magnitude of a waveform as a function of time based upon the display data from the control means, the simulated analog visual representation being representative of a selected system or component of the internal combustion engine under the test condition.

11. The test system of claim 10 wherein the display means includes:

display memory means for storing the display data from the control means; and a point addressable display for displaying the visual representation based upon the stored display data.

12. The test system of claim 10 and further comprising:

a direct memory access (DMA) controller for transferring the digital sample values to selected locations in the data memory means; and means for providing transfer control signals to the DMA controller which indicate an initial address of the data memory means for storing the digital sample values and a number of digital sample values to be transferred.

13. The test system of claim 10 wherein the means for providing a plurality of analog signals includes:

primary waveform circuit means for deriving from an ignition system of the engine a primary analog input waveform for each cylinder of the engine; and secondary waveform circuit means for deriving from the ignition system a secondary analog input waveform for each cylinder of the engine.

14. The test system of claim 13 wherein the display control means comprises means for selecting one of a plurality of display modes; and means for providing the display data, in response to selection of a first display mode, which cause the display means to display both a visual representation of the primary analog input waveform for a selected cylinder based upon a first set of digital sample values and a visual representation of the secondary analog input waveform for the selected cylinder based upon a second set of digital sample values.

15. The test system of claim 13 wherein the display control means comprises means for selecting one of a plurality of display modes; and means for providing the display data, in response to selection of a second display mode, which causes the display means to display simultaneously simulated analog visual representations of primary analog input waveforms for selected cylinders based upon corresponding sets of digital sample values.

16. The test system of claim 13 wherein the display control means comprises means for selecting one of a plurality of display modes; and means for providing the display data, in response to selection of a third display mode, which cause the display means to display simultaneously visual representations of secondary analog input waveforms for selected cylinders based upon corresponding sets of digital sample values.

17. The test system of claim 13 wherein the display control means includes means for providing display control signals which cause the display means to display a visual representation of an alphanumerical designation of the selected cylinder with which the displayed visual representation is associated.

18. A test system for testing operation of an ignition system of a multicylinder internal combustion engine, the test system comprising:

primary waveform circuit means for deriving from the ignition system a primary analog input waveform for each cylinder of the engine;

secondary waveform circuit means for deriving from the ignition system a secondary analog input waveform for each cylinder of the engine;

means for selecting a test which requires at least one of the primary and secondary waveforms;

means for maintaining a count representing the cylinder which corresponds to the waveforms being currently derived;

means for providing a sample enable signal based upon the selected test and the count;

analog-to-digital (A/D) converter means responsive to the sample enable signal for sampling the selected analog input waveform periodically and converting each sample to a digital sample value;

data memory means for storing the digital sample values in locations determined by the selected test;

display control means for providing display data based upon the stored digital sample values; and display means for displaying a simulated analog visual representation of magnitude of a waveform as a function of time based upon the display data.

19. The test system of claim 18 wherein the display control means comprises: means for selecting a first display mode; and means for providing display data, in response to selection of the first display mode, which cause the display means to display both a visual representation of the primary analog input waveform for a selected cylinder based upon a first set of digital sample values and a visual representation of the secondary analog input waveform for the selected cylinder based upon a second set of digital sample values.

20. The test system of claim 18 wherein the display control means comprises: means for selecting a second display mode, and means for providing display data, in response to selection of the second display mode which cause the display means to display simultaneously visual representations of primary analog input waveforms for selected cylinders based upon corresponding sets of digital sample values.

21. The test system of claim 18 wherein the display control means comprises: means for selecting a third display mode; and means for providing display data, in response to selection of the third display mode which cause the display means to display simultaneously visual representations of secondary analog input waveforms for selected cylinders based upon corresponding sets of digital sample values.

22. The test system of claim 18 wherein the control means comprises means for providing display control signals which cause the display means to display a visual representation of an alphanumerical designation of the selected cylinder with which the displayed visual representation of an input waveform is associated.

* * * * *

US004476531B1

REEXAMINATION CERTIFICATE (3717th)

United States Patent [19]

[11] B1 4,476,531

Marino et al.

[45] Certificate Issued Feb. 9, 1999

[54] ENGINE ANALYZER WITH DIGITAL WAVEFORM DISPLAY

[75] Inventors: Joseph A. Marino, Waukesha; Michael J. Kling, Mequon, both of Wis.; Sydney J. Roth, Largo, Fla.

[73] Assignee: SPX Corporation, Muskegon, Mich.

Reexamination Requests:

No. 90/004,102, Nov. 13, 1995
No. 90/004,637, May 15, 1997

Reexamination Certificate for:

Patent No.: 4,476,531
Issued: Oct. 9, 1984
Appl. No.: 327,734
Filed: Dec. 4, 1981

[51] Int. Cl.[6] .......... G01M 15/00; G06F 19/00

[52] U.S. Cl. .......... 701/99; 73/117.3; 324/379; 702/67; 702/113

[58] Field of Search .......... 73/116, 117.2, 73/117.3; 324/378, 379; 701/29, 33, 35, 99, 101, 102; 702/67, 113

[56] References Cited

U.S. PATENT DOCUMENTS

| | | | |
|---|---|---|---|
| 3,686,662 | 8/1972 | Blixt et al. | 340/324 A |
| 3,982,193 | 9/1976 | Maringer . | |
| 4,050,296 | 9/1977 | Benedict | 73/116 |
| 4,053,831 | 10/1977 | Furukawa et al. . | |
| 4,125,894 | 11/1978 | Cashel et al. | 364/442 |
| 4,128,005 | 12/1978 | Arnston et al. | 73/117.3 |
| 4,208,723 | 6/1980 | Lecklider | 364/900 |
| 4,290,064 | 9/1981 | Traster | 340/723 |
| 4,309,900 | 1/1982 | Kreft et al. | 73/117.2 |
| 4,328,546 | 5/1982 | Kreft et al. | 364/424 |
| 4,418,388 | 11/1983 | Allgor et al. . | |

OTHER PUBLICATIONS

Brochure entitled "AVL Digital Analyzer" (May 1978) (Exhibit A).

Instruction manual for AVL Digital Analyzer Type 646 (04 LD/LA/211/E) (Sep., 1979) (Exhibit C).

Function Description and Trouble Shooting Instructions for AVL Type 646 Digital Analyzer (Oct., 1979) (Exhibit H).

Article entitled "Electronic Measuring System for Digital Recording and Analysing of High Speed Processes" Krassnig (Iseta 75, Fourth International Symposium on Engine Testing Automation Performance, Emission & Diagnostics (Sep. 29–Oct. 3, 1975) (Exhibit I).

Instruction Manual Software F CIS VO3 C/E for AVL Digital Analyzer System 646 (May, 1979) (Exhibit J).

*Primary Examiner*—William H. Cuchlinski

[57] ABSTRACT

An engine analyzer for an internal combustion engine includes an analog-to-digital (A/D) converter which digitizes an analog electrical input waveform representing, for example, a secondary or primary voltage waveform of the ignition coil of the internal combustion engine. The digitized input waveform is stored in the form of digital data in a data memory. Upon request by the operator of the apparatus, a microprocessor selects digital data stored, and supplies that digital data to a display, which displays a visual representation of the waveform based upon the selected digital data.

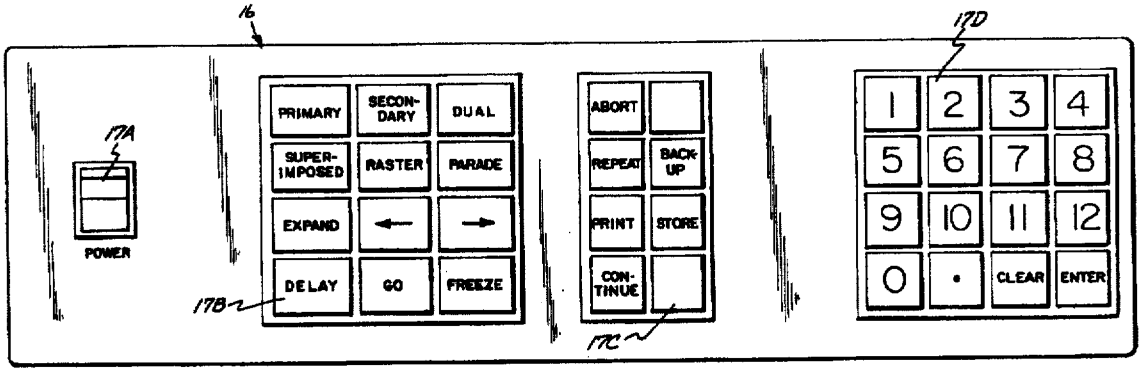

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–22 is confirmed.

New claims 23–47 are added and determined to be patentable.

*23. A test system for testing operation of a selected system or component of a multicylinder internal combustion engine, the test system comprising:*

*means for providing a periodic analog electrical input waveform representative of operation of the selected system or component of the internal combustion engine under a test condition, the analog input waveform having a period which varies with engine speed;*

*analog-to-digital (A/D) converter means for sampling the analog input waveform periodically and converting each sample to a digital sample value which represents magnitude of the waveform at a time when the sample was taken;*

*data memory means for storing the digital sample values;*

*means for selecting a test to be performed;*

*means for maintaining a cylinder count based upon a signal derived from the engine;*

*means for supplying a signal to the A/D converter means to initiate sampling of the analog input waveform by the A/D converter means as a function of the test selected and the cylinder count;*

*means for transferring a predetermined number of the digital sample values representative of the input waveform from the A/D converter means to selected locations in the data memory means based upon the test selected;*

*means for selecting a display mode;*

*means for converting stored digital sample values to display data based upon the display mode selected;*

*display means for displaying a simulated analog visual representation of the magnitude of the input waveform as a function of time based upon the display data; and*

*means for causing the display means to display a visual representation of an alphanumerical designation of a cylinder with which the simulated analog visual representation of a input waveform is associated.*

*24. The test system of claim 23, wherein the display means includes display memory means for storing the display data and a point addressable display for displaying the visual representation based upon the stored display data.*

*25. The test system of claim 24, wherein the means for converting stored digital sample values to display data provides display data which fills in spaces between adjacent points corresponding to the stored digital sample values.*

*26. The test system of claim 23, wherein the means for causing the display means to display a visual representation of an alphanumerical designation of a cylinder causes the display means to display a cylinder number adjacent a waveform associated with that cylinder number.*

*27. The test system of claim 23, wherein the means for causing the display means to display a visual representation of an alphanumerical designation of a cylinder causes the display means to display a plurality of cylinder numbers.*

*28. The test systen of claim 27, wherein the means for causing the display means to display a visual representation of an alphanumerical designation of a cylinder causes the display means to highlight one of the plurality of cylinder numbers.*

*29. The test system of claim 23, wherein as the simulated analog visual representation of the waveform is progressively displayed on the display means, a previous visual representation is progressively erased.*

*30. A test system for testing operation of a selected system or component of a multicylinder internal combustion engine, the test system comprising:*

*means for providing a periodic analog electrical input waveform representative of operation of the selected system or component of the internal combustion engine under a test condition, the analog input waveform having a period which varies with engine speed;*

*analog-to digital (A/D) converter means for sampling the analog input waveform periodically and converting each sample to a digital sample value which represents magnitude of the waveform at a time when the sample was taken;*

*data memory means for storing the digital sample values;*

*means for selecting a test to be performed;*

*means for maintaining a cylinder count based upon a signal derived from the engine;*

*means for supplying a signal to the A/D converter means to initiate sampling of the analog input waveform by the A/D converter means as a function of the test selected and the cylinder count;*

*means for transferring a predetermined number of the digital sample values representative of the input waveform from the A/D converter means to selected locations in the data memory means based upon the test selected;*

*means for selecting a display mode;*

*point addressable display means for displaying a reconstructed simulated analog visual representation of the magnitude of the input waveform as a function of time based upon display data, the reconstructed simulated analog waveform having an appearance of a continuous analog waveform representative of operation of the system and the component of the internal combustion engine under the test condition; and*

*means for converting stored digital sample values to display data based upon the display mode selected, the digital display data representing pixels on the point addressable display means which produce the reconstructed simulated analog waveform so that it has the appearance of a continuous analog waveform, the digital display data including data corresponding to pixels representing individual sampled points of the waveform defined by the stored digital sample values and data corresponding to intermediate pixels between the individual sampled points of the waveform.*

*31. The test system of claim 30, further comprising:*

*means for causing the display means to display a visual representation of an alphanumerical designation of a*

*cylinder with which the simulated analog visual representation of an input waveform is associated.*

*32. The test system of claim 30, wherein the means for providing a periodic analog input waveform includes:*

*means for deriving from an ignition system of the engine an analog ignition waveform for each cylinder of the engine.*

*33. The test system of claim 30, wherein the point addressable display means progressively displays the reconstructed simulated analog visual representation as a previous visual representation is progressively erased.*

*34. A test system for testing operation of a selected system or component of a multicylinder internal combustion engine, the test system comprising:*

*means for providing a plurality of periodic analog waveform signals representative of operation of systems or components of the internal combustion engine, the analog waveform signals having periods which vary as a function of engine speed;*

*input means for providing an input signal selecting a test to be performed;*

*means for providing a count representing a currently operating cylinder of the engine;*

*digitizing means for digitizing a selected analog input signal during a time interval based upon the input signal and the count to produce a plurality of digital sample values representing magnitude of the selected signal as a function of time;*

*data memory means for storing the digital sample values in selected memory locations based upon the input signal;*

*point addressable display means for displaying a reconstructed simulated analog visual representation of magnitude of a waveform as a function of time based upon the display data from the control means, the reconstructed simulated analog visual representation having an appearance of a continuous analog waveform representative of a selected system or component of the internal combustion engine under the test condition; and*

*display control means for providing display data based upon the digital sample values, the digital display data representing pixels on the point addressable display means which produce the reconstructed simulated analog waveform so that it has the appearance of a continuous analog waveform, the digital display data including data corresponding to pixels representing individual sampled points of the waveform defined by the stored digital sample values and data corresponding to intermediate pixels between the individual sampled points of the waveform.*

*35. The test system of claim 34, wherein the point addressable display means includes:*

*display memory means for storing the display data from the control means; and*

*a point addressable display for displaying the visual representation based upon the stored display data.*

*36. The test system of claim 34, wherein the means for providing a plurality of analog signals includes:*

*means for deriving from an ignition system of the engine an analog ignition waveform for each cylinder of the engine.*

*37. The test system of claim 34, wherein the display control means includes means for providing display control signals which cause the point addressable display means to display a visual representation of an alphanumerical designation of the selected cylinder with which the displayed visual representation is associated.*

*38. The test system of claim 37, wherein the means for providing display control signals causes the point addressable display means to display a cylinder number adjacent a waveform associated with that cylinder number.*

*39. The test system of claim 37, wherein the means for providing display control signals causes the point addressable display means to display a plurality of cylinder numbers.*

*40. The test system of claim 39, wherein the means for providing display control signals causes the point addressable display means to highlight one of the plurality of cylinder numbers.*

*41. The test system of claim 34, wherein the point addressable display means progressively displays the reconstructed simulated analog visual representation as a previous visual representation is progressively erased.*

*42. A test system for testing operation of a selected system or component of a multicylinder internal combustion engine, the test system comprising:*

*means for providing a plurality of periodic analog waveform signals representative of operation of systems or components of the internal combustion engine, the analog waveform signals having periods which vary as a function of engine speed;*

*input means for providing an input signal selecting a test to be performed;*

*means for providing a count representing a currently operating cylinder of the engine;*

*digitizing means for digitizing a selected analog input signal during a time interval based upon the input signal and the count to produce a plurality of digital sample values representing magnitude of the selected signal as a function of time;*

*data memory means for storing the digital sample values in selected memory locations based upon the input signal;*

*display control means for providing display data based upon the digital sample values; and*

*display means for displaying a simulated analog visual representation of magnitude of a waveform as a function of time based upon the display data from the control means, the simulated analog visual representation being representative of a selected system or component of the internal combustion engine under the test condition; and*

*wherein the display control means includes means for providing display control signals which cause the display means to display a visual representation of an alphanumerical designation of a selected cylinder with which the displayed visual representation is associated.*

*43. The test system of claim 42, wherein the display means includes:*

*display memory means for storing the display data from the control means; and*

*a point addressable display for displaying the visual representation based upon the stored display data.*

*44. The test system of claim 42, wherein the means for providing display control signals causes the point addressable display means to display a cylinder number adjacent a waveform associated with that cylinder number.*

*45. The test system of claim 42, wherein the means for providing display control signals causes the point addressable display means to display a plurality of cylinder numbers.*

*46. The test system of claim 42, wherein the means for providing display control signals causes the point addressable display means to highlight one of the plurality of cylinder numbers.*

*47. The test system of claim 42, wherein the point addressable display means progressively displays the reconstructed simulated analog visual representation as a previous visual representation is progressively erased.*

* * * * *